(12) United States Patent
Atterberry et al.

(10) Patent No.: US 10,113,493 B2
(45) Date of Patent: Oct. 30, 2018

(54) SYSTEM, METHOD, AND APPARATUS TO CONTROL GAS SUBSTITUTION CHARACTERISTIC IN DUAL FUEL ENGINE

(71) Applicant: Caterpillar Inc., Peoria, IL (US)

(72) Inventors: Nathan P. Atterberry, Washington, IL (US); Matthew J. Engfehr, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 177 days.

(21) Appl. No.: 15/358,453

(22) Filed: Nov. 22, 2016

(65) Prior Publication Data

US 2018/0142633 A1    May 24, 2018

(51) Int. Cl.

| | |
|---|---|
| F02B 9/02 | (2006.01) |
| F02D 41/00 | (2006.01) |
| F02M 35/10 | (2006.01) |
| F02M 35/104 | (2006.01) |
| F02B 37/00 | (2006.01) |
| F02B 29/04 | (2006.01) |
| F01N 13/10 | (2010.01) |
| F02D 41/14 | (2006.01) |
| F01N 13/00 | (2010.01) |
| F02M 21/02 | (2006.01) |

(52) U.S. Cl.
CPC ....... *F02D 41/0027* (2013.01); *F01N 13/008* (2013.01); *F01N 13/10* (2013.01); *F02B 9/02* (2013.01); *F02B 29/0425* (2013.01); *F02B 37/00* (2013.01); *F02D 41/0007* (2013.01); *F02D 41/1446* (2013.01); *F02M 21/0215* (2013.01); *F02M 35/104* (2013.01); *F02M 35/1038* (2013.01); *F02M 35/10157* (2013.01); *F02M 35/10268* (2013.01)

(58) Field of Classification Search
CPC .. F02B 29/0493; F02D 41/0002; F02M 31/04
See application file for complete search history.

(56) References Cited

U.S. PATENT DOCUMENTS

| | | | |
|---|---|---|---|
| 3,257,797 A | 6/1966 | Lieberherr | |
| 5,375,582 A * | 12/1994 | Wimer | F17C 9/04 123/525 |
| 5,839,416 A | 11/1998 | Kruiswyk et al. | |
| (Continued) | | | |

FOREIGN PATENT DOCUMENTS

| | | |
|---|---|---|
| CN | 103557071 A | 2/2014 |
| DE | 10 2012 013 249 A1 | 1/2014 |
| JP | 2008-303763 | 12/2009 |

*Primary Examiner* — Mark Laurenzi
*Assistant Examiner* — Shafiq Mian
(74) *Attorney, Agent, or Firm* — Oblon, McClelland, Maier & Neustadt

(57) ABSTRACT

A system, method and apparatus for controlling a gas substitution characteristic in a dual fuel engine are provided. The gas substitution characteristic can be controlled based on measured characteristics directly or indirectly associated with operation of the dual fuel engine, including intake manifold air pressure (IMAP), load of the dual fuel engine, ambient air temperature, exhaust temperature, fan speed, and/or pressure of natural gas supplied to the dual fuel engine. Further, the gas substitution characteristic can be controlled by controlling intake manifold air temperature (IMAT) based on control of a cooling capacity of a cooling circuit.

20 Claims, 6 Drawing Sheets

(56) References Cited

U.S. PATENT DOCUMENTS

| | | | |
|---|---|---|---|
| 6,145,480 A * | 11/2000 | Betz | F01P 7/165 |
| | | | 123/41.51 |
| 6,276,334 B1 * | 8/2001 | Flynn | F02B 19/14 |
| | | | 123/435 |
| 6,286,311 B1 * | 9/2001 | Chen | F02B 29/0437 |
| | | | 123/41.13 |
| 6,640,773 B2 | 11/2003 | Ancimer et al. | |
| 6,675,579 B1 * | 1/2004 | Yang | F01B 1/12 |
| | | | 123/27 R |
| 7,962,769 B1 * | 6/2011 | Patel | G06F 1/206 |
| | | | 713/300 |
| 2001/0018632 A1 * | 8/2001 | Thomas | F01P 7/167 |
| | | | 701/113 |
| 2010/0012102 A1 * | 1/2010 | Webb | F02M 31/125 |
| | | | 123/552 |
| 2014/0046511 A1 | 2/2014 | Uzkan et al. | |
| 2014/0216403 A1 * | 8/2014 | Stockner | F02M 69/08 |
| | | | 123/445 |
| 2014/0251280 A1 * | 9/2014 | Ikoma | F02D 41/042 |
| | | | 123/478 |
| 2016/0003179 A1 | 1/2016 | Stellwagen | |
| 2016/0017790 A1 | 1/2016 | Kare et al. | |

\* cited by examiner

SYSTEM, METHOD, AND APPARATUS TO CONTROL GAS SUBSTITUTION CHARACTERISTIC IN DUAL FUEL ENGINE

TECHNICAL FIELD

The present disclosure relates to dual fuel engines and, more particularly, to a system, a method and an apparatus for controlling one or more gas substitution characteristics in a dual fuel engine.

BACKGROUND

A dual fuel engine is designed to run on more than one fuel, for example, a liquefied gas-diesel mixture. The dual fuel engine may substitute one fuel for another depending upon the operating characteristics of the dual fuel engine. Generally, in such dual fuel engines, a relatively small quantity of injected liquid diesel fuel may be compression-ignited which, in turn, may ignite a relatively larger charge of natural gas. Combustion pertaining to substituted natural gas may be affected by many factors some of which include intake manifold air temperature (IMAT) and/or natural gas pressure supplied to the dual fuel engine, for instance. In other words, dual fuel engine combustion may be sensitive to IMAT and/or natural gas pressure supplied to the dual fuel engine, which, if not suitably controlled, may limit the amount of natural gas provided for the fuel mixture.

U.S. Patent Publication No. 2014/0046511, hereinafter the '511 publication, describes a system for controlling engine inlet air temperature that may comprise a compressor configured to increase pressure of air at an engine air inlet, and an aftercooler configured to reduce the engine inlet air temperature. According to the '511 publication, the system may also include a controller configured to determine a desired engine inlet air temperature based on signals indicative of sensed ambient air temperature and sensed ambient air pressure. The '511 publication describes that the controller may be configured to control operation of the aftercooler based on a desired engine air inlet temperature.

SUMMARY

In one aspect of the present disclosure, an integrated diesel-natural gas combustion engine system is described. The integrated diesel-natural gas combustion engine system includes a reciprocating compression ignition diesel-natural gas combustion engine configured to operate using injected diesel fuel as the primary fuel source and natural gas as a secondary fuel source. The reciprocating compression ignition diesel-natural gas combustion engine includes an intake manifold and an exhaust manifold. The integrated diesel-natural gas combustion engine system further includes a turbocharger operatively connected to the exhaust manifold and configured to use energy of exhaust gas from the exhaust manifold to compress intake air and output compressed intake air for supply to the intake manifold. The integrated diesel-natural gas combustion engine system also includes an intake manifold air temperature (IMAT) cooling circuit configured to receive the compressed intake air from the turbocharger and cool the compressed intake air. The IMAT cooling circuit includes a radiator, and a fan configured to cool the radiator. The integrated diesel-natural gas combustion engine system further includes an IMAT sensor configured to measure IMAT. The integrated diesel-natural gas combustion engine system further includes a controller in communication with the IMAT sensor. The controller is configured to receive signals from the IMAT sensor regarding measured IMAT. Further, the controller is configured to control IMAT to optimize natural gas to diesel substitution rate by varying a cooling capacity of the IMAT cooling circuit as a function of at least intake manifold air pressure (IMAP) and load of the reciprocating compression ignition diesel-natural gas combustion engine based on the received signals from the IMAT sensor.

In another aspect of the present disclosure, a system for controlling gas substitution ratio in a dual fuel combustion engine is described. The system includes a cooling circuit configured to receive compressed air from a turbocharger and cool the compressed air. The cooling circuit includes a radiator, and a fan configured to cool the radiator. The system further includes a sensor configured to measure intake manifold air temperature (IMAT). The system includes at least one exhaust gas temperature sensor configured to measure exhaust gas temperature. The system further includes a controller in communication with the sensor and the at least one exhaust gas temperature sensor. The controller is configured to receive signals from the sensor regarding measured IMAT, receive signals from the at least one exhaust gas temperature sensor regarding measured exhaust gas temperature, and control gas substitution ratio for the dual fuel combustion engine by controlling a cooling capacity of the cooling circuit based on the received signals from the sensor regarding measured IMAT and/or temperature of exhaust output by the dual fuel combustion engine based on the received signals from the at least one exhaust gas temperature sensor regarding measured exhaust gas temperature.

In yet another aspect of the present disclosure, a method for controlling a gas substitution characteristic in a dual fuel engine is described. The method includes receiving, from a temperature sensor, signals corresponding to measured post-turbocharger intake manifold air temperature (IMAT). The method further includes receiving, from at least one exhaust gas temperature sensor, signals corresponding to measured exhaust gas temperature, and receiving, from at least one gas pressure sensor, signals corresponding to measured natural gas pressure of natural gas supplied to the dual fuel engine. The method further includes varying, using a controller, the gas substitution characteristic of the dual fuel engine according to predetermined optimization mapping responsive to the signals corresponding to the measured IMAT, the signals corresponding to the measured exhaust gas temperature, and/or the signals corresponding to the measured pressure of natural gas supplied to the dual fuel engine.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

Figure 1:
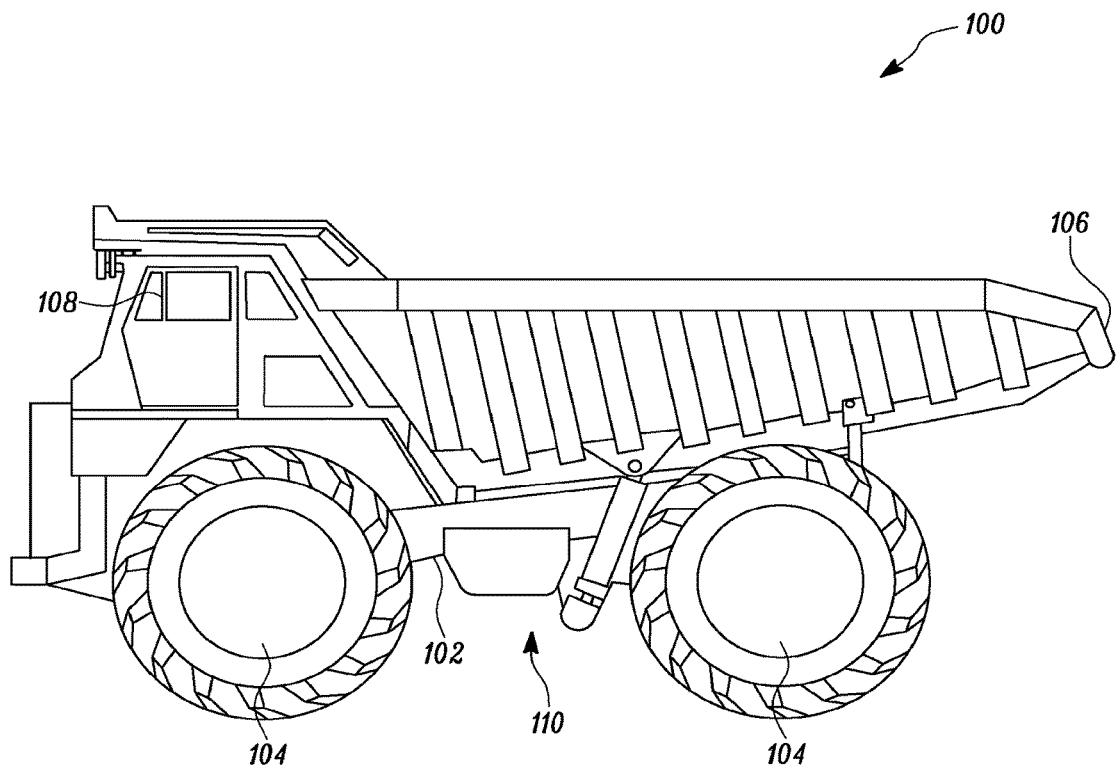
FIG. 1 is a diagrammatic view of a machine, in accordance with one or more embodiments of the present disclosure.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, structures and components may be shown in block diagram form in order to avoid obscuring the concepts of the described subject matter. Wherever possible, corresponding or similar reference numbers will be used throughout the drawings to refer to the same or corresponding parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural references unless the context clearly dictates otherwise. That is, unless clearly specified otherwise, as used herein the words "a" and "an" and the like carry the meaning of "one or more." Additionally, it is to be understood that terms such as "left," "right," "up," "down," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Generally speaking, embodiments of the present disclosure provide a system, a method, and an apparatus to control combustion of a dual fuel engine by controlling or adjusting a gas substitution characteristic of the dual fuel engine. The gas substitution characteristic may be a gas substitution rate, a gas substitution ratio, an amount of gas substitution, or a rate of change of gas substitution. Further, the control or adjustment of the gas substitution characteristic may be to optimize the gas substitution characteristic based on operating characteristics of the dual fuel engine. In general, according to embodiments of the disclosed subject matter, the gas substitution characteristic (or characteristics) may be controlled based on control of intake manifold air temperature (IMAT) and/or control of pressure of natural gas supplied to the dual fuel engine.

Referring now to the figures, FIG. 1 is a diagrammatical representation of a machine, generally referenced by the numeral 100. In FIG. 1, the machine 100 is shown as a mining truck. However, machines according to embodiments of the disclosed subject matter are not limited to the mining truck illustrated in FIG. 1, and may take a variety of other forms including, but not limited to, a tractor, a loader, a marine vessel, a standalone generator, a pump, another type of mining truck, etc.

In general, the machine 100 in the form of a mining truck may include a frame 102 supported on a conveyance 104. In FIG. 1 the conveyance 104 is shown as wheels; however the conveyance 104 is not limited to wheels. For instance, the conveyance 104 may be tracks or a propeller in the case of the machine 100 in the form of a marine vessel. The machine 100 in the form of a mining truck may further include a dump body 106 pivotally attached to the frame 102, and an operator station 108.

In accordance with one or more embodiments of the present disclosure, the machine 100 may include a dual fuel internal combustion engine control system (generally represented by the numeral 110 in FIG. 1) to control a dual fuel engine and/or components associated therewith. Optionally, the dual fuel internal combustion engine system control 110 may be integral in the sense that such control system may include certain engine-related components, such as the dual fuel engine, cooling system(s), intake manifold, exhaust manifold, etc. Hereinafter the terms "integrated diesel-natural gas combustion engine system," "engine system," "control system," and "system" may be used interchangeably.

Figure 2:
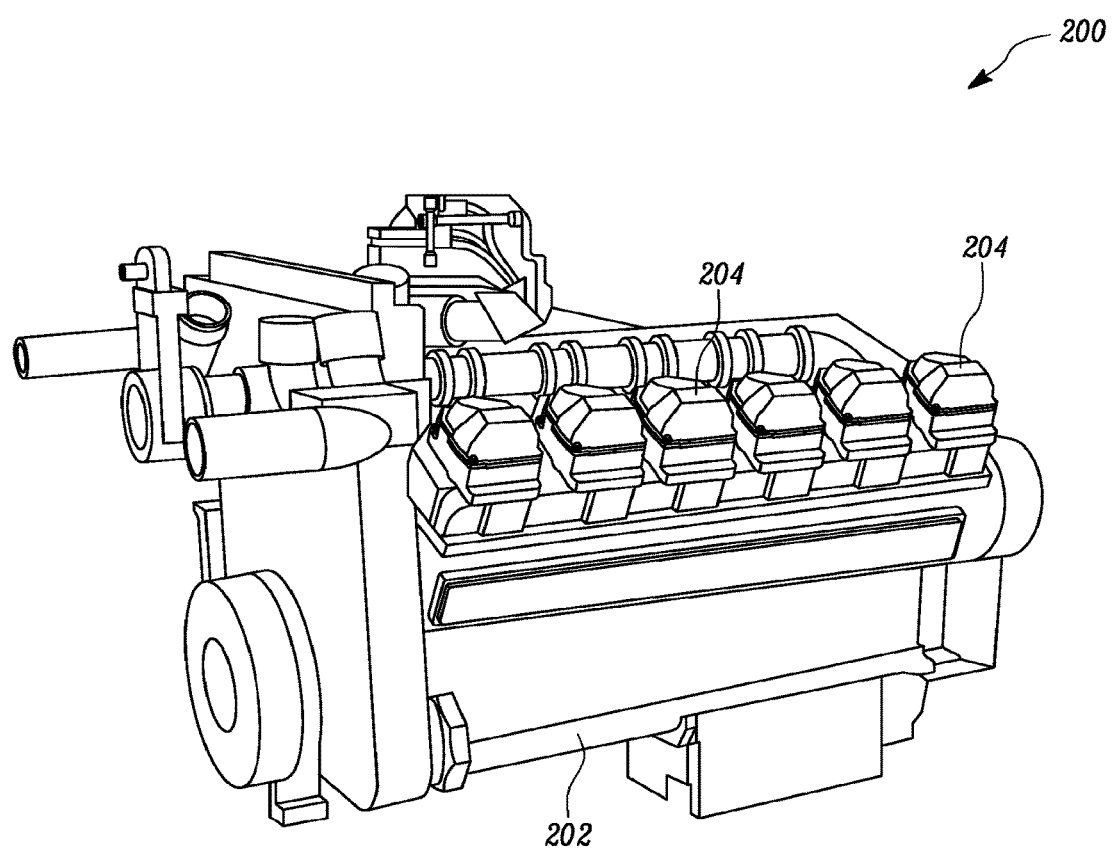
FIG. 2 is a perspective view of an exemplary dual fuel engine, in accordance with one or more embodiments of the present disclosure.

The control system 110 may be comprised of or communicably connected to a dual fuel internal combustion engine, such as dual fuel engine 200 illustrated in FIG. 2. The dual fuel engine 200 may provide motive power to the machine 100. In one example, the dual fuel engine 200 may be supported on the frame 102 and operably coupled to the conveyance 104. For instance, the dual fuel engine 200 may be mechanically coupled to the conveyance 104, or coupled via an intervening electrical generator that supplies electrical power to motors that directly drive the conveyance 104. In any event, direct and/or indirect coupling between the dual fuel engine 200 and the conveyance 104 fall within the intended scope of the present disclosure.

As illustrated in FIG. 2, the dual fuel engine 200 may include an engine block 202. The engine block 202 may include a bank of cylinders, collectively referred to as cylinders 204. The cylinders 204 may be made of metallic alloys, such as steel, aluminum-based alloys, etc. The dual fuel engine 200 may include any number of cylinders 204, and the cylinders 204 may be disposed in an "in-line" configuration, a "V" configuration, a radial configuration, or any other suitable configuration.

In an embodiment of the present disclosure, the dual fuel engine 200 may be a dual fuel engine in the form of a reciprocating dual fuel internal combustion engine (spark ignited or compression ignition), such as a reciprocating diesel-natural gas internal combustion engine. Further, a dual fuel engine according to embodiments of the present disclosure may refer to any internal combustion engine that utilizes two fuels in its combustion space. These two fuels are typically different fuels, but may alternatively be the same fuel at different pressures, for instance. Thus, embodiments of the present disclosure may be implemented with gaseous fuel internal combustion engines that utilize a relatively large charge of natural gas, such as liquefied natural gas (LNG), which may be vaporized to a gaseous state and provided to a combustion space for combustion via compression ignition of a relatively small charge of a distillate fuel, such as diesel fuel. In one or more embodiments, the dual fuel engine 200 may be configured to operate using a pre-mix charge of natural gas and injected diesel fuel as an ignition fuel, or, alternatively, using injected natural gas and injected diesel fuel as an ignition source. It should be appreciated, however, that the dual fuel engine 200 according to one or more embodiments of the disclosed subject matter may operate with different gaseous fuels, such as compressed natural gas (CNG), and, similarly, different main liquid fuels, for example, crude oil, PyOil, or the like. In an exemplary embodiment, dual fuel engine 200 may be configured to operate using a pre-mixed charge of natural gas and injected diesel fuel as an ignition fuel.

Figure 3:
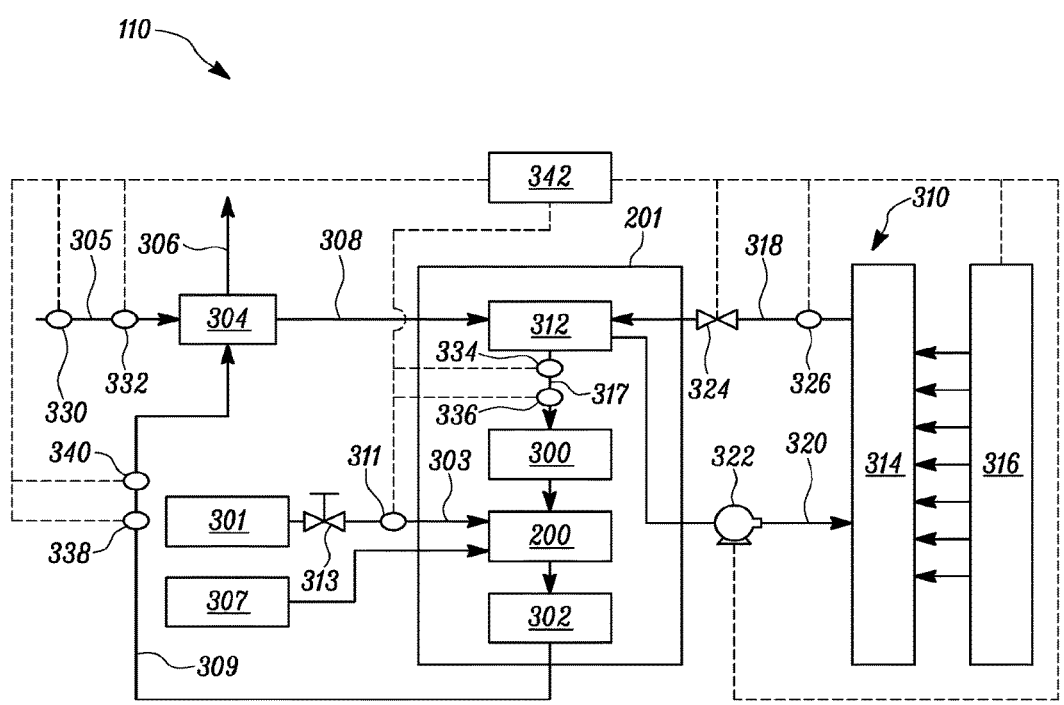
FIG. 3 is a diagram of a system to control a gas substitution characteristic in a dual fuel engine, in accordance with one or more embodiments of the present disclosure.
Figure 4:
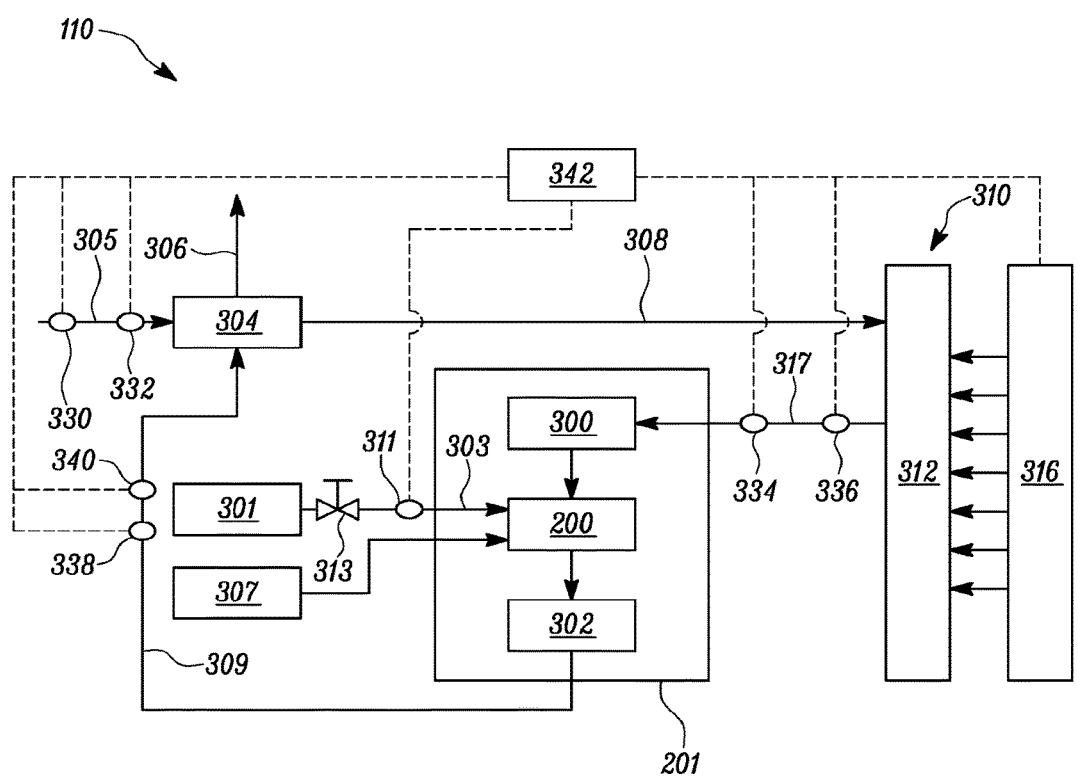
FIG. 4 is a diagram of a system to control a gas substitution characteristic in a dual fuel engine, in accordance with one or more embodiments of the present disclosure.

FIG. 3 and FIG. 4 illustrate diagrams of a control system (illustrated in each figure with numerical indicia 110) according to embodiments of the disclosed subject matter. Generally speaking, the control system 110 may control or adjust (or be configured to control or adjust) a gas substitution characteristic in the dual fuel engine 200. Further, the control or adjustment of the gas substitution characteristic may be to optimize or maintain the gas substitution characteristic based on operating characteristics of the dual fuel engine 200. Optionally, optimization may refer to achieving a highest possible gas substitution characteristic for a given operating condition or conditions of the dual fuel engine 200. Alternatively, optimization may refer to limiting the gas substitution characteristic. In some cases, optimization may include achieving a highest possible value for one gas substitution characteristic and also limiting a value for another gas substitution characteristic.

As illustrated in FIG. 3 and FIG. 4, each control system 110 may include an intake manifold 300. The intake manifold 300 may be disposed in fluid communication with the cylinders 204 of the dual fuel engine 200 to supply air (e.g., charged air) thereto. In one example, the intake manifold 300 may be defined in the engine block 202 and thus form part of the dual fuel engine 200.

Each control system 110 of FIG. 3 and FIG. 4 may also include an exhaust manifold 302, which may also be disposed in fluid communication with the cylinders 204 of the dual fuel engine 200, to receive exhaust gases resulting from combustion of the dual fuel engine 200. In one example, the exhaust manifold 302 may be defined in the engine block 202 and thus form part of the dual fuel engine 200.

The control system 110 of each of FIG. 3 and FIG. 4 may also include a turbocharger 304, which may include a turbine and a compressor (not shown). The turbocharger 304 may be in fluid communication with an air supply line 305 and an exhaust gas outlet line 306. Further, the turbocharger 304 may be operatively connected to the intake manifold 300 via an air passageway 308 and to the exhaust manifold 302 via an exhaust passageway 309. Generally, the turbocharger 304 may use energy of exhaust gas received from the exhaust manifold 302 to compress intake air received via the air supply line 305 and output compressed intake air for supply to the intake manifold 300 via air passageway 308 (and via the respective aftercooler 312 in each of FIG. 3 and FIG. 4).

During operation of the dual fuel engine 200, a mixture of blended fuel and air may be provided in at least one of the cylinders 204. Specifically, a fuel injection system (not shown) may inject one or two fuels into the at least one cylinder 204, and air (e.g., charged air) may be introduced into the at least one cylinder 204 via the intake manifold 300. After combustion, exhaust gas generated by the combustion process may be released from the at least one cylinder 204 via an exhaust system, for instance, an exhaust system connected to the turbocharger 304 via the exhaust manifold 302 (optionally, the exhaust manifold 302 may be deemed part of the exhaust system). The turbocharger 304 may use the energy of the exhaust gas to drive its compressor to compress intake air prior to being supplied to the at least one cylinder 204. Specifically, the exhaust gas can pass through the turbine of the turbocharger 304 so as to rotate the turbine, which can cause the exhaust gas to decrease in pressure and temperature.

The control system 110 may also include a cryogenic fuel tank 301 to store liquid natural gas (LNG) fuel. The LNG fuel may be maintained in a liquid state in the cryogenic fuel tank 301 using cryogenic techniques, for instance. In the control system 110, the LNG fuel may be supplied from the cryogenic fuel tank 301 to at least one cylinder 204 of the dual fuel engine 200 via a gas supply line 303. The control system 110 may include a vaporizer (not shown) in fluid communication with the cryogenic fuel tank 301 to vaporize the LNG fuel provided from the cryogenic fuel tank 301, and the vaporized LNG may be supplied to the dual fuel engine 200 via the gas supply line 303. Further, the control system 110 may include a liquid fuel tank 307 to store liquid fuel, such as diesel fuel, to be supplied to the dual fuel engine 200 as a primary or ignition fuel source, for instance.

The control system 110 may also include a natural gas pressure sensor 311, for instance, a pressure transducer, provided at the gas supply line 303 to measure pressure of gas flowing to the at least one cylinder 204 of the dual fuel engine 200. Optionally, the natural gas pressure sensor 311 may be arranged after a filter (not illustrated) in the gas supply line 303 and before a regulator (not illustrated) of the gas supply line 303. Signals from the natural gas pressure sensor 311 may be sent to a controller 342. Further the control system 110 may include an excess flow valve 313 disposed at the gas supply line 303, for instance, upstream of the natural gas pressure sensor 311, which may detect an abnormal change (e.g., abrupt) in pressure of the flow of gas in the gas supply line 303. Further, the excess flow valve 313 may be activated to cut-off or reduce the supply of gas to the dual fuel engine 200 responsive to the detection of the abnormal change in pressure of the flow of gas in the gas supply line 303. Not expressly illustrated, the excess flow valve 313 may be coupled to the controller 342, and the controller 342 may control the opening and closing of the excess flow valve 313 to control the flow of gas in the gas supply line 303 based on signals from the natural gas pressure sensor 311.

According to one or more embodiments of the disclosed subject matter, the control system 110 may also include a cooling circuit 310. The cooling circuit 310 may be configured to adjust (e.g., cool) intake manifold air temperature (IMAT), and may be referred to herein as an IMAT cooling circuit. Generally, the cooling circuit 310 may cool air from the turbocharger 304 prior to the air being injected as charge air into intake manifold 300 of the dual fuel engine 200. That is, the cooling circuit 310 may receive the compressed intake air from the turbocharger 304 and cool the compressed intake air before passing the compressed air to the intake manifold 300 of the dual fuel engine 200. For this purpose, the cooling circuit 310 may include an aftercooler 312 and a fan 316. Optionally, the cooling circuit 310 may include a radiator 314, such as illustrated in FIG. 3. In one or more embodiments, the fan 316 may be configured to adjust a temperature modification capacity of the radiator 314 (e.g., a cooling capacity thereof). Alternatively, the fan 316 may be configured to adjust a temperature modification capacity of the aftercooler 312 (e.g., a cooling capacity thereof), such as illustrated in FIG. 4.

The aftercooler 312 may be air-air cooled or water-air cooled, or may utilize a combination of air-air and water-air cooling. The air passageway 308 may connect the turbocharger 304 to the aftercooler 312, which, in turn, may be connected to the intake manifold 300 via an air passageway 317. Thus, the cooling circuit 310, particularly the aftercooler 312, may be disposed in fluid communication with the turbocharger 304 to receive the compressed intake air from the turbocharger 304. Optionally, as illustrated in FIG. 3, for instance, the aftercooler 312 may be part of a control subsystem 201, which may also include the intake manifold 300, the dual fuel engine 200, and the exhaust manifold 302. In contrast, FIG. 4 does not include the aftercooler 312 as part of the control sub system 201.

In one example, as illustrated in FIG. 3, for instance, the cooling circuit 310 may include or be configured as a separate circuit aftercooler (SCAC) circuit. The cooling circuit 310 in the form of the SCAC circuit may have a coolant supply line 318 and a coolant return line 320 to circulate liquid coolant through the SCAC circuit between the aftercooler 312 and the radiator 314. The cooling circuit 310 in the form of the SCAC circuit may also include a pump 322, for instance, to aid in circulation of liquid coolant between the aftercooler 312 and the radiator 314. Further, the cooling circuit 310 in the form of the SCAC circuit may include a control valve 324, which may be operatively coupled to controller 342, to control flow rate of the liquid coolant circulating in the SCAC circuit. The cooling circuit 310 may also include a temperature sensor 326 (e.g., a thermostat), disposed at the fluid supply line 318, to measure temperature of the liquid coolant flowing in the SCAC circuit. The control valve 324 may be controlled by the controller 342 to allow the flow of the liquid coolant from the radiator 314 to the aftercooler 312, for instance, only if the temperature of the liquid coolant is below a certain predefined threshold.

In one or more embodiments of the disclosed subject matter, control of coolant through the SCAC circuit, using the controller 342, for instance, may be used to control (e.g., raise, lower or maintain) the IMAT of the dual fuel engine 200. For example, the controller 342 may control the pump 322, the control valve 324, and/or the temperature sensor 326 (e.g., a thermostat, which may be passive or active) to control the temperature of the liquid coolant of the SCAC circuit and thus the IMAT. Thus, the control valve 324 may be used to control how much liquid coolant (e.g., flow rate) is provided to the aftercooler 312, and such control of liquid coolant may be used to control IMAT at the intake manifold 300, as noted above. For example, the control valve 324 may be controlled to allow a higher rate of liquid coolant to flow through the aftercooler 312, which may cause a decrease in IMAT. Further, additionally or alternatively, the temperature of the liquid coolant through the SCAC circuit may be controlled based on control of the fan 316 by the controller 342, for instance. Thus, such control of the temperature of the liquid coolant may be used to control IMAT at the intake manifold 300.

In another example, as illustrated in FIG. 4, for instance, the cooling circuit 310 may include or be configured as an air-to-air aftercooler (ATAAC) circuit. The cooling circuit 310 in the form of the ATAAC circuit may have the aftercooler 312 in fluid communication with the turbocharger 304 to receive the compressed intake air via the air passageway 308 and route the compressed intake air from the aftercooler 312 to the intake manifold 300, via the air passageway 317.

In one or more embodiments of the disclosed subject matter, control of coolant (i.e., air) through the ATAAC circuit, using the controller 342, for instance, may be used to control (e.g., raise, lower or maintain) the IMAT of the dual fuel engine 200. For example, the controller 342 may control the temperature of air output by the ATAAC circuit via air passageway 317, which may be used to control the IMAT. The controller 342 may control the fan 316 to control the temperature of air output by the ATAAC circuit. For example, the controller 342 may increase the speed of the fan to reduce the temperature of air output from the aftercooler 312 via air passageway 317 to the intake manifold 300.

The control system 110 may also include one or more sensors to measure corresponding one or more operational characteristics or conditions of the dual fuel engine 200. As noted above, the control system 110 may include the natural gas pressure sensor 311 to measure pressure of natural gas provided to the dual fuel engine via gas supply line 303. The control system 110 may also include one or more of an ambient air pressure sensor 330, an ambient air temperature sensor 332, an intake manifold air pressure (IMAP) sensor 334, an intake manifold air temperature (IMAT) sensor 336, an exhaust gas pressure sensor 338, and an exhaust gas temperature sensor 340.

The control system 110 may further include the controller 342, which may be implemented in or as circuitry. Generally speaking, the controller 342 may be configured to control operation of the various components of the control system 110. Further, the control system 110 may be in communication with each of the sensors 311, 330, 332, 334, 336, 338, 340 via corresponding communication lines (shown as dashed lines). The controller 342 may also be coupled to other components of the control system 110, such as excess flow valve 313, control valve 324, fan 316, pump 322, etc., and configured to control each of the components based on signals from corresponding sensors 311, 330, 332, 334, 336, 338, 340 and optionally other inputs. Optionally, it may be contemplated that the controller 342 may be in communication with additional components of the machine 100 to receive other system-related inputs, if desired.

The controller 342 may include a processor, memory, and a network interface (not expressly shown). The controller 342 may also include circuitry components such as a bus to provide communication and control data between components of the controller 342. The controller 342 may further include an input/output interface that facilitates communication with various components of the control system 110, such as the components discussed above. The controller 342 may be configured to control various operations of the control system 110 and the dual fuel engine 200 by executing operating instructions, such as, computer readable program code stored in the memory thereof.

Further, the controller 342 may be or include a logic unit using one or more integrated circuits, microchips, microcontrollers, microprocessors, all or part of a Central Processing Unit (CPU), Graphics Processing Unit (GPU), Digital Signal Processor (DSP), Field Programmable Gate Array (FPGA), or other circuits suitable for executing instructions or performing logic operations. It will be appreciated that other peripheral circuitry such as buffers, latches, switches and so on may be implemented within the controller 342, or separately, as desired. Various modules or circuits may also be associated with the controller 342, such as a power supply module or circuitry, a signal conditioning module or circuitry, a solenoid driver module or circuitry, and other types of modules or circuitry. Further it may be understood that the controller 342 may be associated with a software product stored on a non-transitory computer readable memory (not shown) and comprising data and computer-implementable instructions. The non-transitory computer-readable medium may include a memory, such as RAM and/or ROM, a flash memory, a hard drive, etc. to store electronic data associated with operation of the control system 110.

The ambient air pressure sensor 330 may be configured (including positioned) to measure air pressure of ambient air, such as air outside a compartment of the dual fuel engine 200 or the machine 100. In particular, the ambient air pressure sensor 330 may embody a strain gauge-type sensor, a piezo-resistive type pressure sensor, or any other type of pressure sensing or measuring device. The ambient air pressure sensor 330 may generate a signal indicative of the ambient air pressure and send this signal to the controller 342. The ambient air temperature sensor 332 may measure temperature of ambient air, for instance, air outside the compartment of the dual fuel engine 200 or the machine 100, flowing into the turbocharger 304. In some examples, the ambient air temperature sensor 332 may be a surface temperature type sensor that measures a wall temperature at an entry point of the turbocharger 304. The ambient air temperature sensor 332 may generate a signal indicative of ambient air temperature and send this signal to the controller 342. Each of the signals output by the ambient air pressure sensor 330 and the ambient air temperature sensor 332 may be sent to the controller 342 continuously, on a periodic basis, or only when prompted by the controller 342.

The IMAP sensor 334 may be provided, for instance, at the intake manifold 300, such as illustrated in FIG. 3, and configured to measure pressure (e.g., absolute pressure) of air entering the intake manifold 300 of the dual fuel engine 200. The IMAP sensor 334 may embody a strain gauge-type sensor, a piezo-resistive type pressure sensor, or any other type of pressure sensing or measuring device. The IMAP sensor 334 may generate a signal indicative of the IMAP and send this signal to the controller 342. The IMAT sensor 336 may be provided, for instance, at an inlet of the dual fuel engine 200 or the intake manifold 300, such as illustrated in FIG. 3, and configured to measure temperature of air entering the intake manifold 300 of the dual fuel engine 200. The IMAT sensor 336 may generate a signal indicative of the IMAT and send this signal to the controller 342. Each of the signals output by the IMAP sensor 334 and the IMAT sensor 336 may be sent to the controller 342 continuously, on a periodic basis, or only when prompted by the controller 342.

The exhaust gas pressure sensor 338 may be provided to measure pressure (e.g., absolute pressure) of exhaust gases output by the dual fuel engine 200. Such exhaust pressure may be measured at an output of the exhaust manifold 302, downstream of the exhaust manifold 302, such as illustrated in FIG. 3 and FIG. 4, and/or at the at least one cylinder 204 or at each of the at least one cylinders 204. Thus, in one or more embodiments, the exhaust gas pressure sensor 338 may be representative of multiple exhaust gas pressure sensors at one general location or at different locations. The exhaust gas pressure sensor 338 may embody a strain gauge-type sensor, a piezo-resistive type pressure sensor, or any other type of pressure sensing or measuring device known in the art. The exhaust gas pressure sensor 338 may generate an exhaust gas pressure signal and send this signal to the controller 342. The exhaust gas temperature sensor 340 may be provided to measure temperature of exhaust gas output by the dual fuel engine 200. Such exhaust temperature may be measured at an output of the exhaust manifold 302, downstream of the exhaust manifold 302, such as illustrated in FIG. 3 and FIG. 4, and/or at the at least one cylinder 204 or at each of the at least one cylinders 204. The exhaust gas temperature sensor 340 may be in the form of one or more exhaust port thermocouples associated with one or more cylinders 204 of the dual fuel engine 200. Thus, in one or more embodiments, the exhaust gas temperature sensor 340 may be representative of multiple exhaust gas temperature sensors at one general location or at different locations. The exhaust gas temperature sensor 340 may embody a surface-temperature-type sensor and/or an exhaust port thermocouple that measures a wall temperature of the fluid passageway 309 leading to the turbocharger 304 and/or the exhaust port of the one or more cylinders 204. The exhaust gas temperature sensor 340 may generate a signal (or signals in the case of multiple sensors) indicative of exhaust gas temperature and send this signal to the controller 342. Each of the signals output by the exhaust gas pressure sensor 338 and the exhaust gas temperature sensor 340 may be sent to the controller 342 continuously, on a periodic basis, or only when prompted by the controller 342. Thus, in one or more embodiments, the exhaust gas pressure sensor 338 and/or the exhaust gas temperature sensor 340 may be provided downstream of the at least one cylinder 204.

It may be understood that intake manifold air temperature (IMAT) of the dual fuel engine 200 operating on natural gas as the secondary fuel source, for instance, may impact one or more gas substitution characteristics of the dual fuel engine 200, such as an allowable or acceptable natural gas to diesel substitution ratio. Thus, controlling the IMAT may be a way to control the gas substitution characteristic(s), for instance, to optimize such gas substitution characteristic(s). According to one or more embodiments of the disclosed subject matter, IMAT may be controlled based on one or more operating characteristics of the dual fuel engine 200, which, may increase or optimize operating efficiency of the dual fuel engine 200.

In an embodiment of the present disclosure, the controller 342 may receive signals from the IMAT sensor 336 regarding measured IMAT and control the cooling capacity of the IMAT cooling circuit in order to optimize a gas substitution characteristic for the dual fuel engine 200. Additionally or alternatively, IMAT may be controlled as a function of at least measured IMAP, load of the dual fuel engine 200, fan speed, ambient air temperature, exhaust temperature, and/or IMAT (as noted in the preceding sentence). For example, the controller 342 may output a control signal or signals to modify a cooling capacity (e.g., increase or decrease) of the cooling circuit 310. Such control may be performed as a function of at least measured IMAP, load of the dual fuel engine 200, fan speed, ambient air temperature, exhaust temperature, and/or IMAT. Further, the controller 342 may vary the cooling capacity of the cooling circuit 310 by controlling one or more of speed of the fan 316, pump rate of the pump 322 (in the case of FIG. 3), flow rate of the liquid coolant through the control valve 324 (in the case of FIG. 3), temperature setting of the temperature sensor 326 (in the case of FIG. 3), and air temperature of air in air passageway 317 (in the case of FIG. 4).

For example, in relation to FIG. 3, by increasing the speed of the fan 316, the temperature of the liquid coolant may be lowered by the radiator 314 and output to the aftercooler 312, which may cool the charged air from the turbocharger 304 supplied to the intake manifold 300 (i.e., IMAT). As another example, by increasing the pump rate of the pump 322, liquid coolant may be made to pass through the aftercooler 312 at an increased rate, which may cool the charged air from the turbocharger 304 supplied to the intake manifold 300. Similarly, by increasing the flow rate of the liquid coolant using the control valve 324, more liquid coolant may be made to pass through the aftercooler 312, which may cool the charged air from the turbocharger 304 supplied to the intake manifold 300. Also, by adjusting the setting of the temperature sensor 326 (e.g., thermostat setting), the cooling circuit 310 may only allow, for instance, liquid coolant with a temperature of a predetermined range to flow to the aftercooler 312, which may cool the charged air from the turbocharger 304 supplied to the intake manifold 300.

In or more embodiments of the present disclosure, the controller 342 may control the IMAT to control (e.g., optimize) a gas substitution characteristic (e.g., substitution ratio or rate) by varying the speed of the fan 316, for instance, as a function of the IMAT. For this purpose, the controller 342 may receive signals from the IMAT sensor 336 regarding measured IMAT. Therefore, the controller 342 may increase the speed of the fan 316 (within limits), for instance, to control the IMAT.

Additionally or alternatively, in one example, the controller 342 may control the IMAT to optimize a gas substitution characteristic (e.g., gas substitution ratio or rate) by varying the speed of the fan 316 as a function of load of the dual fuel engine 200 and/or other combustion parameters. Further, it may be contemplated that the load of the dual fuel engine 200 may also be indicative of relatively high IMAP and/or IMAT. In one example, the load on the dual fuel engine 200 may be determined by comparing, using the controller 342, for instance, one or more of the ambient air pressure (as measured by the ambient air pressure sensor 330) and the ambient air temperature (as measured by the ambient air temperature sensor 332) with one or more of the corresponding exhaust gas pressure (as measured by the exhaust gas pressure sensor 338) and the exhaust gas temperature (as measured by the exhaust gas temperature sensor 340). However, the load of the dual fuel engine 200 may be determined by any other technique without any limitations. As an example, when the load of the dual fuel engine 200 is determined to have increased, the controller 342 may increase the speed of the fan 316 to reduce the IMAT, for instance, to control the gas substitution characteristic (e.g., gas substitution rate or ratio) of the dual fuel engine 200.

In one or more embodiments, the controller 342 may provide control signals to actively or dynamically optimize the gas substitution characteristic relative to an ideal or predetermined gas substitution characteristic. For instance, a gas substitution ratio may be continuously controlled relative to an ideal or predetermined IMAT for given operating characteristics or conditions of the dual fuel engine 200 to optimize the gas substitution ratio for changing operating characteristics or conditions of the dual fuel engine 200. In some examples, data from optimization maps may be accessed from memory of the controller 342, for instance, to retrieve data to control various components of the control system 110 to achieve or maintain a desired (e.g., optimal) gas substitution characteristic. Further, such control may be provided by the controller 342 and based on measured operating characteristics or conditions of the dual fuel engine 200. For example, the controller 342, or in general the control system 110, may be configured to achieve an optimum/highest gas substitution characteristic (e.g., gas substitution ratio), so as to replace as much diesel as possible with natural gas substitution, which may lead to higher operating efficiency of the dual fuel engine 200.

Further, it may be understood that the pressure of gas flowing to the dual fuel engine 200, operating on natural gas as the secondary fuel source, for instance, may also impact an allowable or acceptable gas substitution characteristic, such as a natural gas-to-diesel substitution ratio or rate of change. For example, when the pressure of gas flow is reduced from a nominal or desired value, the dual fuel engine 200 may attempt to run at a maximum substitution ratio. However, the cryogenic fuel tank 301 may not be able to maintain a required pressure for the flow of gas to the dual fuel engine 200. Such condition may cause the pressure of the gas to fall below a threshold level, which may degrade or disable gas substitution completely. Furthermore, if the natural gas pressure is relatively low, the dual fuel engine 200 may attempt to increase gas substitution too quickly, i.e., with a relatively high rate of change of gas substitution ratio. Such attempt may cause a relatively sharp decrease in pressure of gas flow to the dual fuel engine 200, which may cause an unintended activation of the excess flow valve 313, and halt or unsatisfactorily reduce the supply of gas to the dual fuel engine 200. In this regard, it may be noted that pressure reduction of the gas flow may be due to many reasons, for example, the LNG level in the cryogenic fuel tank 301 may be low, or the LNG may be relatively cold such that the pressure available from the cryogenic fuel tank 301 is reduced.

In view of the foregoing, in one or more embodiments of the present disclosure, control of a gas substitution characteristic may be as a function of natural gas pressure supplied to the dual fuel engine 200. For example, the controller 342 may control the gas substitution characteristic based on measured pressure of gas provided to the dual fuel engine 200, for instance. In embodiments of the disclosed subject matter, the rate at which gas substitution can be increased may be limited. Limiting the rate at which gas substitution can be increased may provide for relatively moderate control of pressure of natural gas supplied to the dual fuel engine 200. Such control may result in any pressure drop of the gas flow being relatively less abrupt (i.e., gradual). Optionally, the substitution ratio (i.e., the amount of gas substitution) or rate of change of substitution ratio may be determined via look-up tables dependent on pressure of flow of gas to the dual fuel engine 200, as measured by the natural gas pressure sensor 311, for instance. The look-up tables may be predefined and stored in memory of the controller 342 of the control system 110, for instance.

INDUSTRIAL APPLICABILITY

The present disclosure may be applicable for dual fuel internal combustion engines in which a first distillate fuel is used as the ignition source and at least part of the overall fuel source, and a second gaseous fuel, for instance, methane, makes up the remainder of the fuel source. Such dual fuel engines may be in heavy equipment and machines, such as the machine 100 of the present disclosure. Further, as recognized herein, dual fuel engines of heavy equipment and machines may be turbocharged using a turbocharger, such as turbocharger 304. The turbocharger may generate charged air for the dual fuel engine, such as dual fuel engine 200, which may be used in the combustion process. The charged air may increase the quantity (e.g., density) of air for combustion and increase the heat value or temperature of the intake air. However, such charged air may have a relatively high temperature, which may increase intake manifold air temperature (IMAT) in the dual fuel engine. In turn, an increase or increased IMAT may negatively affect dual fuel combustion and therefore a gas substitution characteristic of the dual fuel engine. Thus, embodiments of the present disclosure may be implemented in situations of such dual fuel engines where the IMAT becomes or is anticipated to become relatively high (or low) compared to an ideal IMAT for given operating characteristics or conditions of the dual fuel engine. Further, embodiments of the present disclosure may be implemented in case of factors, such as relatively high ambient air temperature, relatively high under-hood temperature (when air may be defined as recirculated around the engine), relatively high exhaust gas temperature, natural gas pressure supplied to the dual fuel engine 200, or any other condition that may negatively affect the gas substitution characteristic(s) of the dual fuel engine 200.

Figure 5:
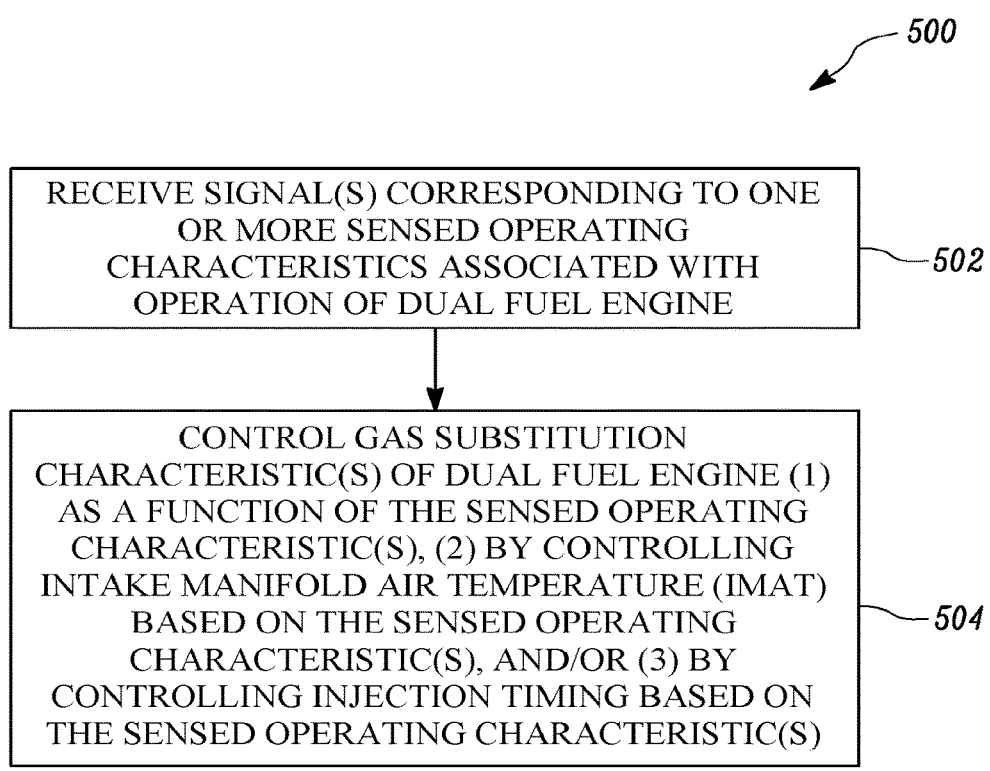
FIG. 5 is a flowchart of a method for controlling a gas substitution characteristic in a dual fuel engine, in accordance with one or more embodiments of the present disclosure.

FIG. 5 illustrates a flow diagram of a method 500 for controlling a gas substitution characteristic of a dual fuel engine, such as dual fuel engine 200. The method 500 may be implemented in whole or in part using a controller, such as the controller 342, of the control system 110.

At block 502, the method 500 may include receiving one or more signals corresponding to one or more measured operating characteristics associated with operation of the dual fuel engine 200. The signals may be received by corresponding one or more sensors of control system 110, such as engine intake manifold air temperature (IMAT) received from the IMAT sensor 336. Other signals may include measured exhaust gas temperature from the exhaust gas temperature sensor 340, measured natural gas pressure provided to the dual fuel engine 200 received from natural gas pressure sensor 311, measured speed of fan 316, etc.

At block 504, the method 500 may control one or more gas substitution characteristics of the dual fuel engine 200. In particular, the gas substitution characteristic(s) may be controlled as a function of the measured operating characteristics associated with operation of the dual fuel engine 200, by controlling IMAT based on the measured operating characteristics associated with operation of the dual fuel engine 200, such as measured exhaust gas temperature. Such control may be performed by a controller, such as controller 342, and may optimize the one or more gas substitution characteristics.

Figure 6:
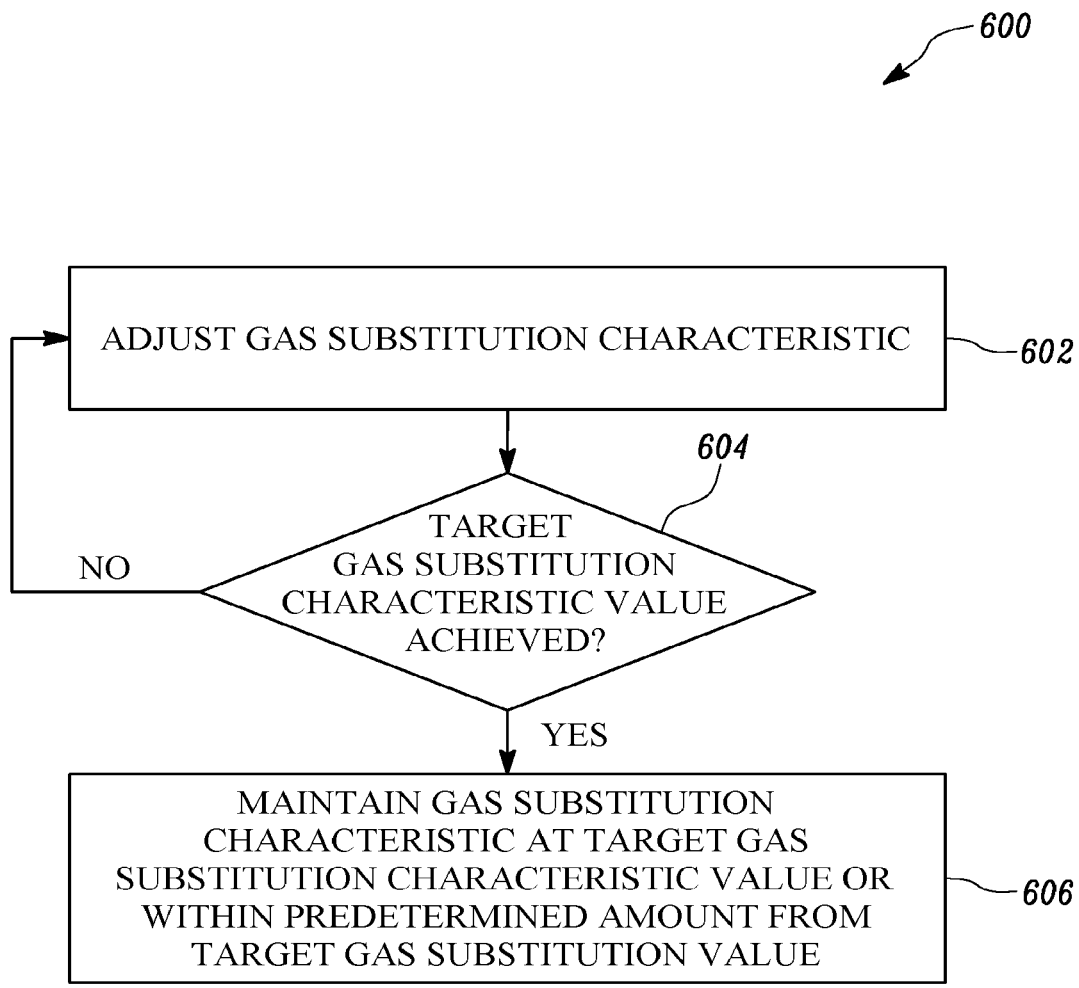
FIG. 6 illustrates a flowchart of a process for controlling a gas substitution characteristic in a dual fuel engine, in accordance with one or more embodiments of the present disclosure.

FIG. 6 illustrates a flow diagram of a process 600 for controlling a gas substitution characteristic of a dual fuel engine, such as dual fuel engine 200. The process 600 may be implemented in whole or in part using a controller, such as the controller 342, of the control system 110.

At block 602, the process 600 may adjust (which may include maintain) a gas substitution characteristic of the dual fuel engine 200. Optionally, the adjustment of the gas substitution characteristic at block 602 may be such as set forth in the method 500 of FIG. 5.

At block 604, the process may determine whether the gas substitution characteristic has been suitable adjusted. For example, at block 604, the process may continuously determine whether the gas substitution characteristic has been adjusted enough to reach a target gas substitution characteristic value. Such target substitution gas characteristic value may be a threshold value or a range of values. Further, such target substitution gas characteristic value(s) may be based on one or more gas substitution characteristic optimization maps. If at block 604 the gas substitution characteristic is determined to have met the target gas substitution characteristic value, the process may proceed to block 606.

At block 606, the process may maintain the gas substitution characteristic at the target gas substitution characteristic value (or within a range of values). Optionally, the target gas substitution characteristic value may change based on changing operating conditions or characteristics of the dual fuel engine 200, in which case the process may dynamically maintain the gas substitution characteristic at the target gas substitution characteristic value.

The control system 110, according to one or more embodiments of the present disclosure, may maintain an optimum gas substitution characteristic in the dual fuel engine 200, which may lead or result in higher or enhanced operating efficiency of the dual fuel engine 200. For example, embodiments of the present disclosure may provide for (e.g., control an increase of) a ratio of natural gas to diesel in the dual fuel engine 200 to a relatively high ratio. Further, embodiments of the present disclosure may maintain an optimum gas substitution ratio even if the IMAT sensor 336 and/or the IMAP sensor 334 fail, by controlling the dual fuel engine 200 based on the exhaust gas temperature and/or exhaust gas pressure readings as measured by the exhaust gas temperature sensor 340 and/or the exhaust gas pressure sensor 338, respectively. Additionally, embodiments of the disclosed subject matter may optimize an amount of gas substitution and/or a rate of change of gas substitution) responsive to measured pressure of natural gas supplied to the dual fuel engine 200.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An integrated diesel-natural gas combustion engine system comprising:
 a reciprocating compression ignition diesel-natural gas combustion engine configured to operate using injected diesel fuel as the primary fuel source and natural gas as a secondary fuel source, the reciprocating compression ignition diesel-natural gas combustion engine including:
  an intake manifold, and
  an exhaust manifold;
 a turbocharger operatively connected to the exhaust manifold and configured to use energy of exhaust gas from the exhaust manifold to compress intake air and output compressed intake air for supply to the intake manifold;
 an intake manifold air temperature (IMAT) cooling circuit configured to receive the compressed intake air from the turbocharger and cool the compressed intake air, the IMAT cooling circuit including:
  a radiator, and
  a fan configured to cool the radiator;
 an IMAT sensor configured to measure IMAT; and a controller in communication with the IMAT sensor and configured to:
  receive signals from the IMAT sensor regarding measured IMAT, and
  control IMAT to optimize natural gas to diesel substitution rate by varying a cooling capacity of the IMAT cooling circuit as a function of at least intake manifold air pressure (IMAP) and load of the reciprocating compression ignition diesel-natural gas combustion engine based on the received signals from the IMAT sensor.

2. The integrated diesel-natural gas combustion engine system according to claim 1, wherein the IMAT cooling circuit is a separate circuit aftercooler (SCAC) circuit in fluid communication with the turbocharger to receive the compressed intake air and configured to circulate liquid coolant between an aftercooler thereof and the radiator.

3. The integrated diesel-natural gas combustion engine system according to claim 2, wherein the controller is configured to vary the cooling capacity of the SCAC circuit further as the function of speed of the fan.

4. The integrated diesel-natural gas combustion engine system according to claim 2, wherein the controller is configured to vary the cooling capacity of the SCAC circuit by controlling one or more of speed of the fan, a pump rate of a pump of the SCAC circuit configured to circulate the liquid coolant, at least one control valve configured to control flow rate of the liquid coolant circulating through fluid lines of the SCAC circuit, and a thermostat setting of the SCAC of the SCAC circuit.

5. The integrated diesel-natural gas combustion engine system according to claim 2, further comprising at least one exhaust port thermocouple configured to measure exhaust port temperature of a corresponding cylinder of the reciprocating compression ignition diesel-natural gas combustion engine,
  wherein the controller is configured to optimize the natural gas to diesel substitution rate based on exhaust port temperature measured by the at least one exhaust port thermocouple.

6. The integrated diesel-natural gas combustion engine system according to claim 1, wherein the IMAT cooling circuit is an air-to-air aftercooler (ATAAC) circuit in fluid communication with the turbocharger to receive the compressed intake air and configured to route the compressed intake air to the radiator then to the intake manifold.

7. The integrated diesel-natural gas combustion engine system according to claim 6, wherein the controller is configured to vary the cooling capacity of the ATAAC circuit by controlling speed of the fan.

8. The integrated diesel-natural gas combustion engine system according to claim 6, further comprising at least one sensor configured to measure exhaust gas temperature,
  wherein the controller is configured to vary the cooling capacity of the ATAAC circuit further as the function of exhaust gas temperature based on a signal from the at least one sensor.

9. The integrated diesel-natural gas combustion engine system according to claim 1, further comprising a plurality of exhaust port thermocouples each configured to measure exhaust port temperature of respective cylinders of the reciprocating compression ignition diesel-natural gas combustion engine,
  wherein the controller is configured to optimize natural gas to diesel substitution rate based on signals from the exhaust port thermocouples.

10. A system for controlling gas substitution ratio in a dual fuel combustion engine, comprising:
  a cooling circuit configured to receive compressed air from a turbocharger and cool the compressed air, the cooling circuit including:
    a radiator, and
    a fan configured to cool the radiator;
  a sensor configured to measure intake manifold air temperature (IMAT);
  at least one exhaust gas temperature sensor configured to measure exhaust gas temperature; and
  a controller in communication with the sensor and the at least one exhaust gas temperature sensor and configured to:
    receive signals from the sensor regarding measured IMAT,
    receive signals from the at least one exhaust gas temperature sensor regarding measured exhaust gas temperature, and
    control gas substitution ratio for the dual fuel combustion engine by controlling a cooling capacity of the cooling circuit based on the received signals from the sensor regarding measured IMAT and/or temperature of exhaust output by the dual fuel combustion engine based on the received signals from the at least one exhaust gas temperature sensor regarding measured exhaust gas temperature.

11. The system according to claim 10, wherein the controller is configured to control the gas substitution ratio as a function of speed of the fan.

12. The system according to claim 10, wherein the cooling circuit is a separate circuit aftercooler (SCAC) circuit configured to circulate liquid coolant between an aftercooler thereof and the radiator to control the cooling capacity of the cooling circuit to cool the IMAT.

13. The system according to claim 12, wherein the controller is configured to control the gas substitution ratio by controlling one or more of speed of the fan, a pump rate of a pump of the SCAC circuit, at least one control valve configured to control flow rate of the liquid coolant circulating through fluid lines of the SCAC circuit, and a thermostat setting of the SCAC of the SCAC circuit.

14. The system according to claim 10, further comprising at least one exhaust port thermocouple configured to measure exhaust port temperature of a corresponding cylinder of the dual fuel combustion engine,
  wherein the controller is configured to optimize the gas substitution ratio based on exhaust port temperature measured by the at least one exhaust port thermocouple.

15. The system according to claim 10, wherein the cooling circuit is an air-to-air aftercooler (ATAAC) circuit configured to route the compressed air to the radiator and then to an air intake manifold of the dual fuel combustion engine.

16. The system according to claim 15, wherein the controller is configured to control the gas substitution ratio by varying the cooling capacity of the ATAAC circuit by controlling speed of the fan.

17. The system according to claim 15, further comprising at least one sensor configured to measure exhaust gas temperature,
  wherein the controller is configured to control the cooling capacity of the ATAAC circuit as a function of the exhaust gas temperature based on a signal from the at least one sensor.

18. A method for controlling a gas substitution characteristic in a dual fuel engine, comprising:

receiving, from a temperature sensor, signals corresponding to measured engine intake manifold air temperature (IMAT);

receiving, from at least one exhaust gas temperature sensor, signals corresponding to measured exhaust gas temperature;

receiving, from at least one gas pressure sensor, signals corresponding to measured pressure of natural gas supplied to the dual fuel engine; and varying, using a controller, the gas substitution characteristic of the dual fuel engine according to predetermined optimization mapping responsive to the received signals corresponding to the measured IMAT, the received signals corresponding to the measured exhaust gas temperature, and/or the signals corresponding to the measured pressure of natural gas supplied to the dual fuel engine.

19. The method according to claim 18, wherein the gas substitution characteristic is one of gas substitution rate, gas substitution ratio, and gas substitution rate of change.

20. The method according to claim 18, wherein the control controls a cooling capacity of one of a separate circuit aftercooler (SCAC) circuit and a an air-to-air aftercooler (ATAAC) circuit to vary the gas substitution characteristic.

* * * * *